(12) United States Patent
Fyke et al.

(10) Patent No.: US 8,627,220 B2
(45) Date of Patent: Jan. 7, 2014

(54) APPARATUS AND METHOD FOR INVOKING A FUNCTION BASED ON A GESTURE INPUT

(75) Inventors: Steven Henry Fyke, Waterloo (CA); Jerome Pasquero, Waterloo (CA); Michael Joseph Defazio, Waterloo (CA)

(73) Assignee: Blackberry Limited, Waterloo (CA)

( * ) Notice: Subject to any disclaimer, the term of this patent is extended or adjusted under 35 U.S.C. 154(b) by 1063 days.

(21) Appl. No.: 12/571,612

(22) Filed: Oct. 1, 2009

(65) Prior Publication Data
US 2011/0083100 A1 Apr. 7, 2011

(51) Int. Cl.
*G06F 3/00* (2006.01)
*G06F 9/00* (2006.01)
*G06F 17/00* (2006.01)

(52) U.S. Cl.
USPC ........... 715/763; 715/762; 715/765; 715/863; 345/204

(58) Field of Classification Search
USPC ......... 345/204, 173, 174, 175, 176, 177, 178, 345/156; 716/139; 715/762, 763, 764, 765, 715/863, 864, 866
See application file for complete search history.

(56) References Cited

U.S. PATENT DOCUMENTS

| | | | |
|---|---|---|---|
| 2002/0043451 A1 | 4/2002 | Barat et al. | |
| 2004/0218474 A1* | 11/2004 | Yamazaki et al. | 368/82 |
| 2005/0268251 A1* | 12/2005 | Bennetts et al. | 715/810 |
| 2007/0097094 A1* | 5/2007 | Prados et al. | 345/173 |
| 2007/0152983 A1* | 7/2007 | McKillop et al. | 345/173 |
| 2008/0204418 A1 | 8/2008 | Cybart et al. | |
| 2008/0204463 A1* | 8/2008 | Cybart et al. | 345/520 |
| 2009/0046072 A1* | 2/2009 | Emig et al. | 345/173 |

FOREIGN PATENT DOCUMENTS

| | | |
|---|---|---|
| EP | 0 274 670 A2 | 7/1988 |
| FR | 2 842 766 A1 | 1/2004 |
| WO | WO 2008019512 A1 | 2/2008 |

OTHER PUBLICATIONS

EESR dated Mar. 17, 2010 of the corresponding EP application No. 09171977.3, Mar. 17, 2010.
Linco, Reginald—Canadian Intellectual Property Office, "Examiner's Requisition" for Canadian Patent Application No. 2,716,098 dated Aug. 1, 2013.

* cited by examiner

Primary Examiner — Kieu Vu
Assistant Examiner — Anita D Chaudhuri
(74) Attorney, Agent, or Firm — Ridout & Maybee LLP

(57) ABSTRACT

An electronic apparatus is provided including an input assembly. The input assembly includes a graphic display layer, a masking layer, and an input device. The graphic display layer includes a plurality of function icons. The masking layer includes a plurality of function icon windows for displaying functions icons associated with a particular application. Each of the displayed function icons corresponds to a function of the particular application. The input device includes a plurality of input device sections for receiving a gesture input. The graphic display layer is moveable relative to the masking layer such that, based on the relative positioning between the graphic display layer and the masking layer, function icons associated with a particular application are displayed through the function icon windows and the other function icons are at least obscured by the masking layer. The receiving of the gesture input by a one of the plurality of input device sections corresponding to a one of the displayed function icons invokes the function corresponding to the one of the displayed function icons.

17 Claims, 13 Drawing Sheets

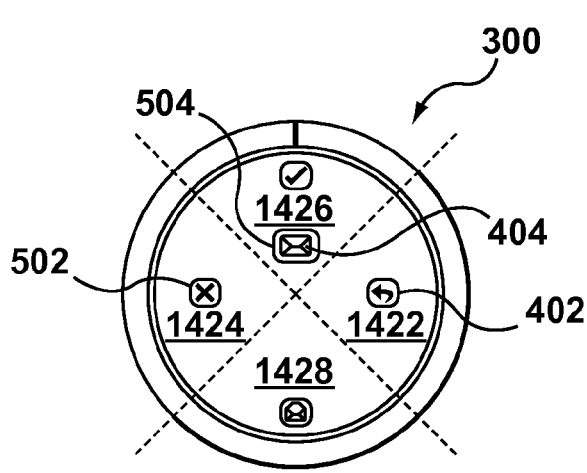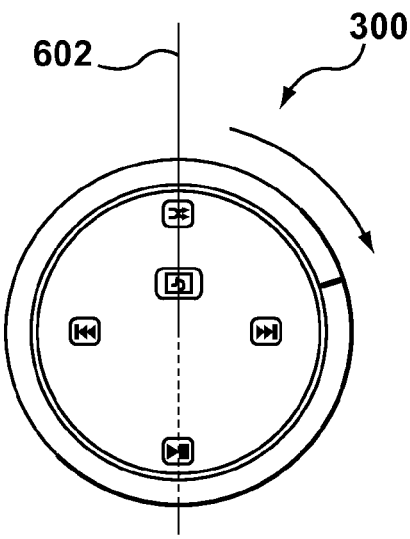
FIG. 6A        FIG. 6B
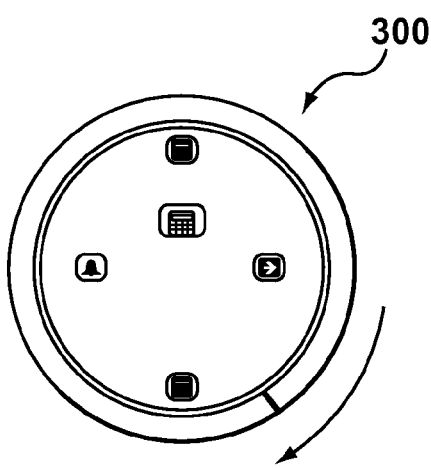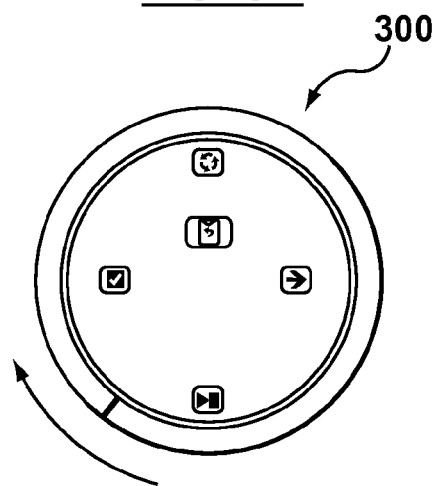
FIG. 6C        FIG. 6D
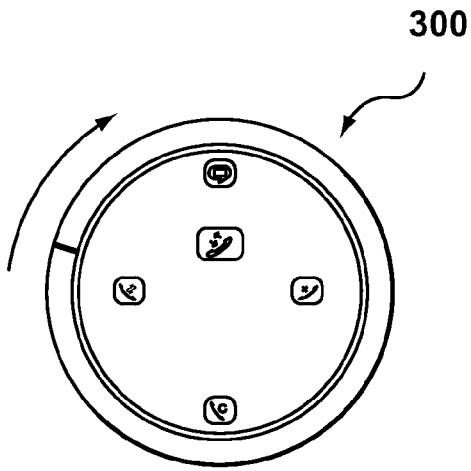
FIG. 6E

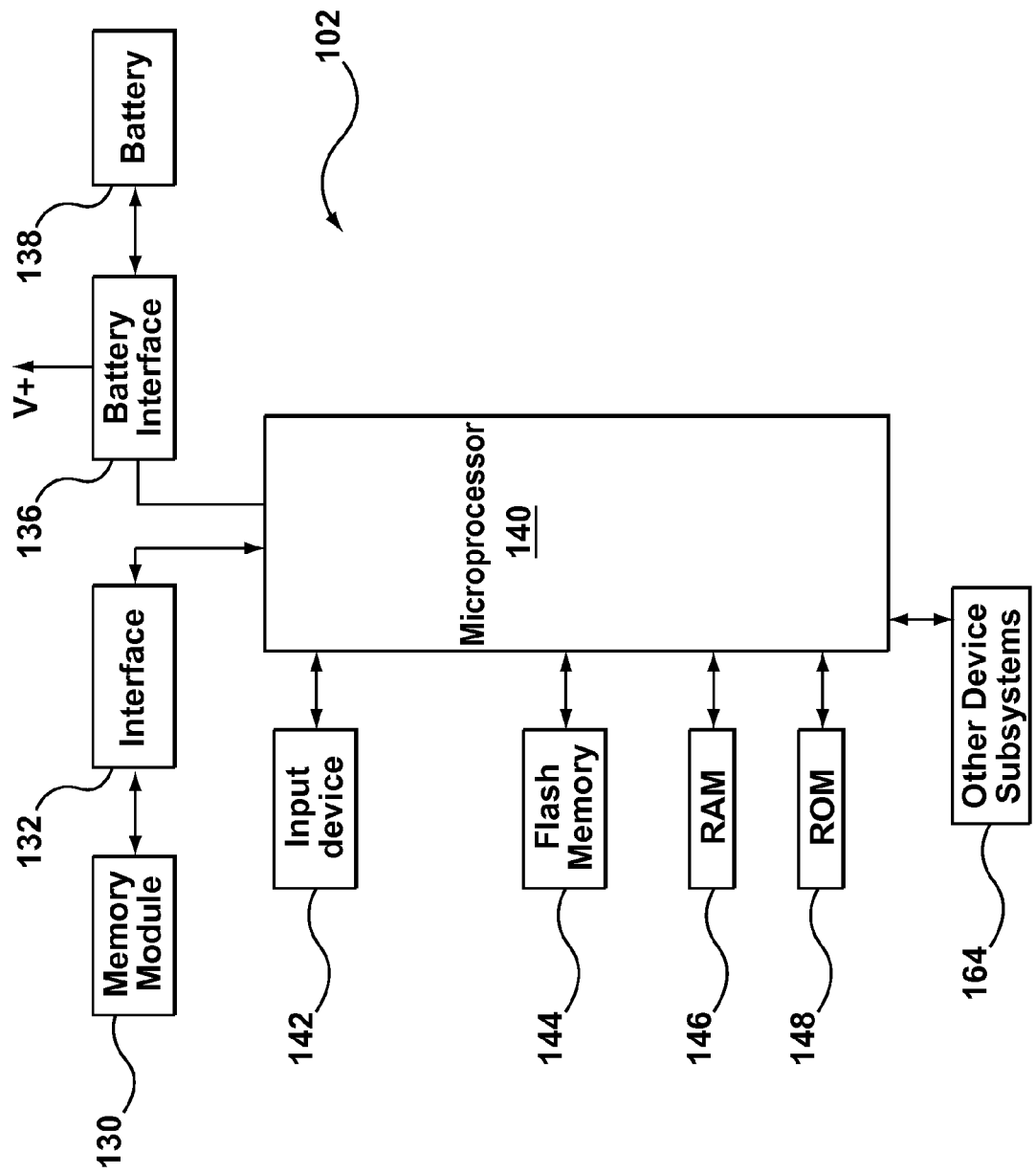

APPARATUS AND METHOD FOR INVOKING A FUNCTION BASED ON A GESTURE INPUT

TECHNICAL FIELD

The present disclosure relates generally to an electronic apparatus and method for invoking a function based on a gesture input.

BACKGROUND

Some electronic apparatuses, such as mobile devices or mobile communication devices, include a touch sensing component for accepting or sensing touch input. Such inputs are also referred to as gesture inputs, which can be a point gesture input, or a vector or directional gesture input.

Although the touch sensing component is often a touchscreen display, in some cases, the touch sensing component does not include a display, or the display aspect of the touch sensing component is selectively disabled. For example, where the display aspect of a touch sensing component, such as a touchscreen display, consumes significant battery power, in the interest of decreasing power consumption, especially for mobile devices, the display aspect is disabled for all or a portion of the component at certain times or in certain modes of operation. In such cases, it would be desirable to provide the user with information about the functions that are invokable based on a gesture input.

BRIEF DESCRIPTION OF THE DRAWINGS

Reference will now be made to the drawings, which show by way of example embodiments of the present disclosure, and in which:

FIGS. 6A-6E illustrates an example operation of the input assembly of FIG. 2;

FIG. 11 shows in block diagram form an electronic apparatus in accordance with an example embodiment.

It will be noted that throughout the appended drawings, like features are identified by like reference numerals.

DETAILED DESCRIPTION

Figure 1:
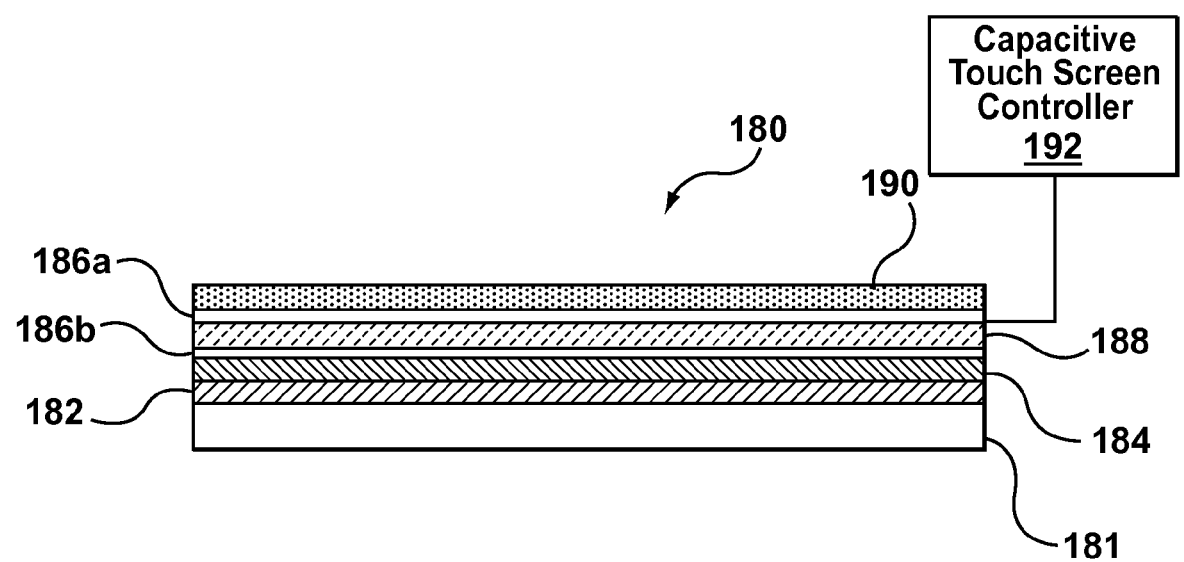
FIG. 1 shows a cutaway view of an example input device, in accordance with an example embodiment of the present disclosure.

As is used herein, the term "icon" is intended to include any one of graphic, text, or visual link.

In one aspect, for example as shown in FIGS. 1-6, there is provided an electronic apparatus 102. The electronic apparatus 102 includes an input assembly 300. The input assembly 300 includes a graphic display layer 302, a masking layer 304, and an input device 142. The graphic display layer 302 includes a plurality of function icons 402. The masking layer 304 includes a plurality of function icon windows 502 for displaying functions icons 402 associated with a particular application. Each of the displayed function icons 402 corresponding to a function of the particular application. The input device 142 further includes a plurality of input device sections 1422, 1424, 1426, 1428 for receiving a gesture input.

The graphic display layer 302 is moveable relative to the masking layer 304 such that, based on the relative positioning between the masking layer 304 and the graphic display layer 302, function icons 402 associated with a particular application are displayed through the function icon windows 502 and the other function icons 402 are at least obscured by the masking layer 304. The receiving of a gesture input by an input device section 1422, 1424, 1426, 1428 corresponding to a one of the displayed function icons 402 invokes the function corresponding to the one of the displayed function icons 402.

In some embodiments, the input device 142 includes a touch sensing component. In some examples, the input device 142 includes a display component, such as an LCD display. In other examples, the input device 142 has no display component. For example, the touch sensing component is a touch-sensitive overlay, such as in the form of a capacitive touch-sensitive overlay 180, as shown in FIG. 1. In some example embodiments, the capacitive touch-sensitive overlay 180 includes a number of layers in a stack and is fixed to the input device 142 via a suitable optically clear adhesive. The layers include, for example, a substrate 181 fixed to the LCD display by a suitable adhesive (not shown), a ground shield layer 182, a barrier layer 184, a pair of capacitive touch sensor layers 186, including an outer touch sensor layer 186a and an inner touch sensor layer 186b separated by a substrate or other barrier layer 188, and a cover layer 190 fixed to the outer capacitive touch sensor layer 186a by a suitable adhesive (not shown). The capacitive touch sensor layers are made of any suitable material such as patterned indium tin oxide (ITO).

A touch event is detected upon user touching of the touch sensing component. Typically, such a touch event is determined upon a user touch at the touch sensing component for selection of, for example, a feature in a list, such as a message or other feature for scrolling in the list or selecting a virtual input key. Signals are sent from the capacitive touch-sensitive overlay 180 to the microprocessor 140 when a suitable object such as a finger or other conductive object held in the bare hand of a user, is detected. Thus, the touch event is detected and an X and a Y location of the touch is determined. Typically, the X and Y location of the touch is determined to fall within the touch-sensitive area defined by the boundary on the touch sensing component.

Reference is again made to FIG. 1. In the present example, the X and Y locations of a touch event are both determined, with the X location being determined by a signal generated as a result of capacitive coupling with one of the touch sensor layers 186a, 186b and the Y location being determined by the signal generated as a result of capacitive coupling with the other of the touch sensor layers 186a, 186b. In this example, each of the touch-sensor layers 186a, 186b provides a signal to the microprocessor 140 as a result of capacitive coupling with a suitable object such as a finger of a user or a conductive object held in a bare hand of a user resulting in a change in the electric field of each of the touch sensor layers.

In some examples, the outer touch sensor layer 186*a* is connected to a capacitive touch screen controller 192 in the electronic apparatus 102 for conducting a continuous electrical current across the inner touch sensor layer 186*b* and detecting a change in the capacitance as a result of capacitive coupling between, for example, the finger of a user or a conductive stylus held by a user, and the outer touch sensor layer 186*a*. Thus, the change in capacitance acts as a signal to the capacitive touch screen controller 192, which senses the touch or near touch, on the capacitive touch-sensitive overlay 180.

When a user places a finger, or other conductive object (e.g., a conductive stylus) on the capacitive touch-sensitive overlay 180 without applying force to cause the outer and inner touch sensor layers 186*a*, 186*b* to contact each other, capacitive coupling of the finger or conductive object with the outer touch sensor layer 186*a* occurs, resulting in a signal at the capacitive touch screen controller 192. Capacitive coupling also occurs through the cover layer 190 and through a small air gap (not shown). Thus, capacitive coupling occurs, resulting in a signal being sent to the capacitive touch screen controller 192, when the finger or other conductive object (e.g., held in the bare hand of a user) approaches the surface of the cover layer 190 and when contacting the cover layer 190, prior to force being applied to the cover layer 190 to force the outer and inner touch sensor layers 186*a*, 186*b* into contact with each other. The sensitivity of the capacitive touch screen controller 192 can therefore be set to detect an approaching finger (or other conductive object) at a small distance away from the cover layer 190 of, for example, 9 mm or less. In some examples, the location of approach is not determined, however the approach of a finger or other conductive object that is proximal the outer touch sensor layer 186*a* is determined. Thus, the outer touch sensor layer 186*a* and the capacitive touch screen controller 192 act to detect proximity, detecting a finger or conductive object proximal the surface of the cover layer 190.

The signals represent the respective X and Y touch location values. It will be appreciated that other attributes of the user's touch on the capacitive touch-sensitive overlay 180 can be determined. For example, the size, the shape, and/or the direction of the touch on the capacitive touch-sensitive overlay 180 can be determined in addition to the location (e.g., X and Y values) based on the signals received at the controller from the touch sensor layers.

It will be appreciated that, in some example embodiments, a user's touch on the capacitive touch-sensitive overlay is determined by determining the X and Y touch location and user-selected input is determined based on the X and Y touch location and the application executed by the processor. This determination is carried out by the processor using one or more software modules, including the specific application being executed.

Touch inputs include gesture inputs, such as point or tap gesture inputs, or vector or directional gesture inputs. By "directional gesture input" is meant a vector or directional touch input, in which the touch input has a beginning point and a different ending point, the touch input being continuous between the beginning and ending points. The directional gesture input is directional, in that a gesture input having a given trajectory between given beginning and ending points is distinct from another gesture input with reversed beginning and ending points along the same trajectory. For example, a directional gesture input is sensed as a continuous input or as a series of point inputs within a predetermined threshold. For example, two sensed point inputs that occur within 1 mm of each other within 0.1 s are considered to be part of a single directional gesture input.

As well, it is understood that the input device 142 can include any other input mechanism, including one or more physical keys. For example, and referring to FIG. 3C, the input device 142, instead of a touch-sensitive overlay, such as the capacitive touch-sensitive overlay 180, can include one or more physical keys 1422*a*, 1424*a*, 1426*a*, 1428*a*. A respective function icon window S02 corresponds to each one of the physical keys 1422*a*, 1424*a*, 1426*a*, 1428*a*. A gesture input is effected by selecting and touching one of the one or more physical keys. In this case, one gesture input is differentiated from a different gesture input by the selection of different physical keys or combination of physical keys. In another example, the input device 142 includes a combination of one or more physical keys and a touch sensing component. Other such configurations are possible.

While an example of an input device having a touch sensing component is a touch screen display, the touch sensing component need not include any display aspect. Where the touch sensing component includes a display aspect, in some examples the display is completely or partially disabled at certain times or in certain modes of operation to conserve power.

Where the input device 142 does not include any display aspect, in some examples, the electronic apparatus 102 includes a display, such as an electronic display (not shown). The display can be completely or partially disabled at certain times or in certain modes of operation to conserve power. Alternatively or in addition, in some examples the electronic apparatus 102 cooperates with a separate display apparatus, for example a separate electronic display screen, such as through wired or wireless communication. The display apparatus responds to input received through the electronic apparatus 102. In some examples, the electronic apparatus 102 does not include any display component or electronic display and does not cooperate with any other display apparatus.

Figure 2:
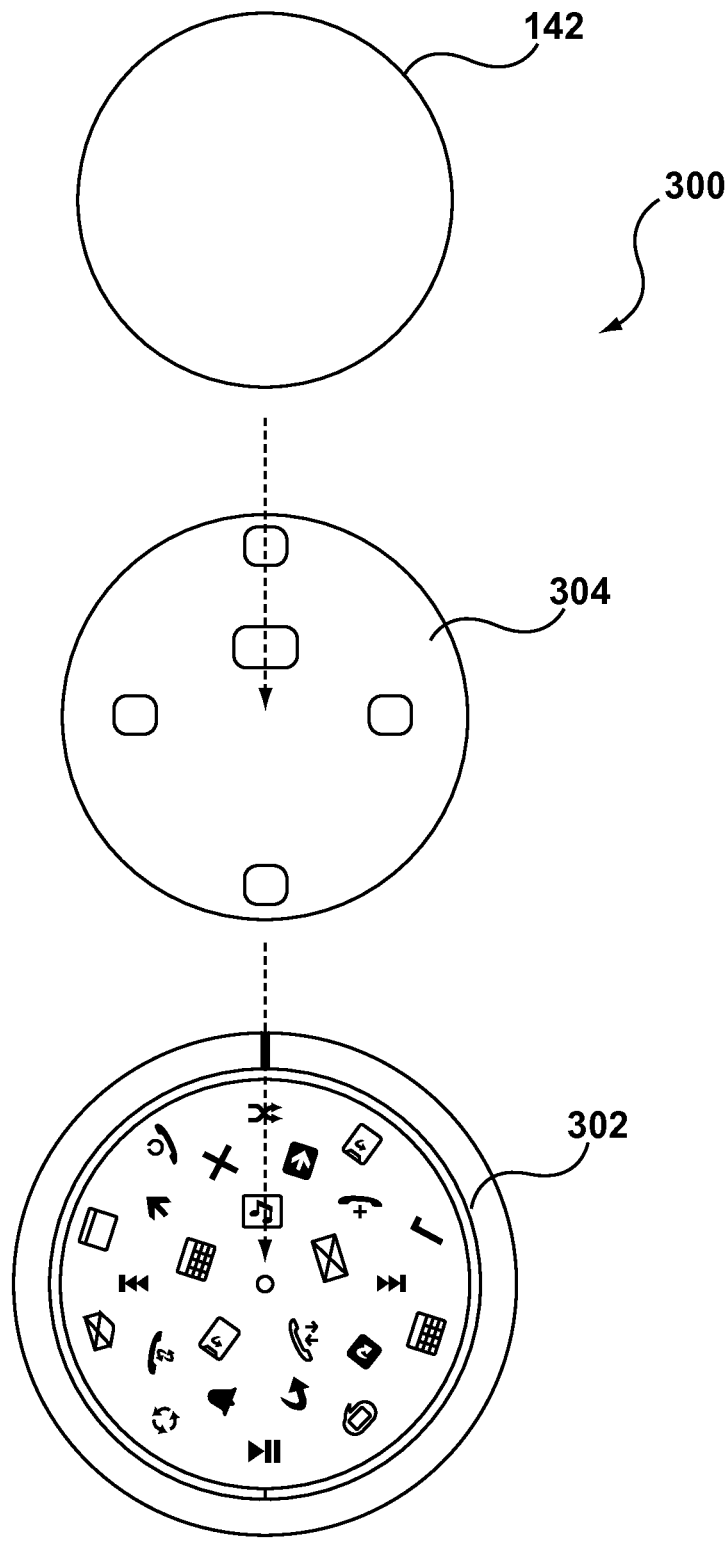
FIG. 2 shows an exploded front view of an input assembly, in accordance with an example embodiment of the present disclosure.
Figure 3A:
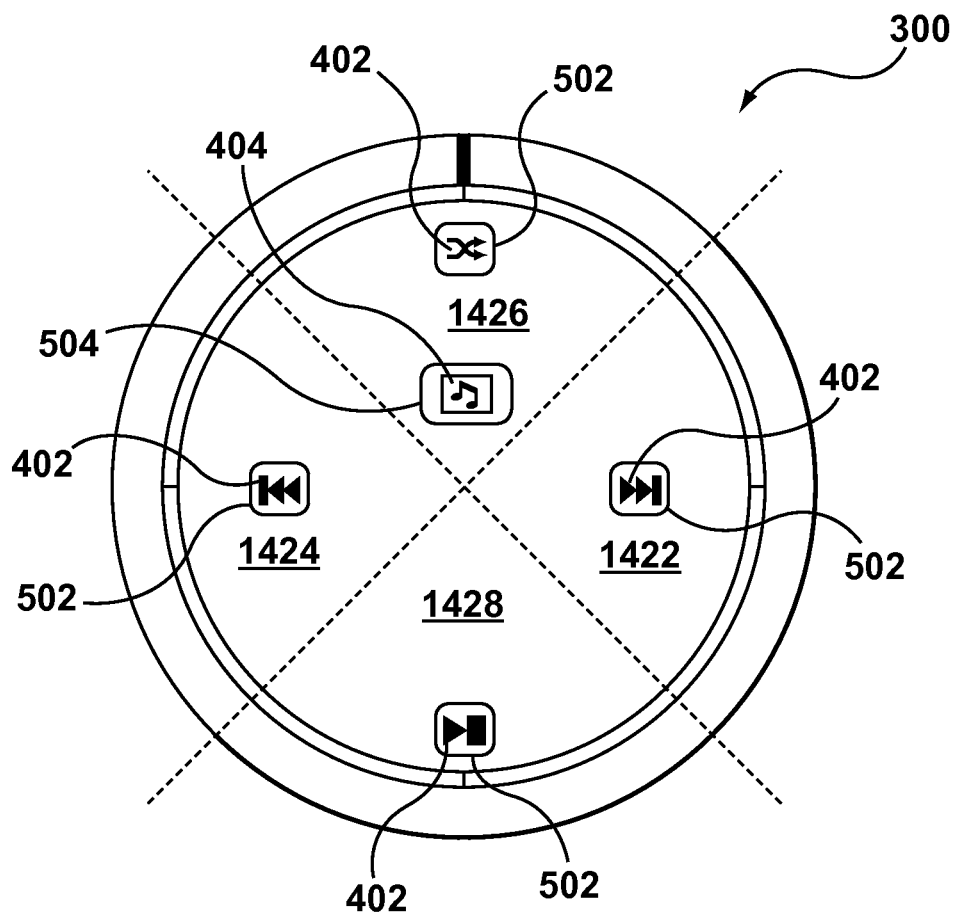
FIG. 3A shows an assembled front view of the assembly of FIG. 2.
Figure 3B:
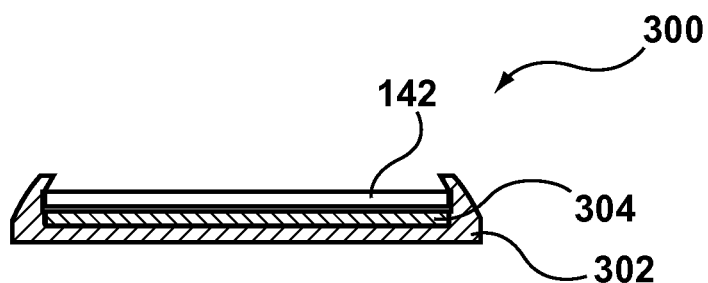
FIG. 3B shows an assembled side cutaway view of the assembly of FIG. 2.
Figure 3C:
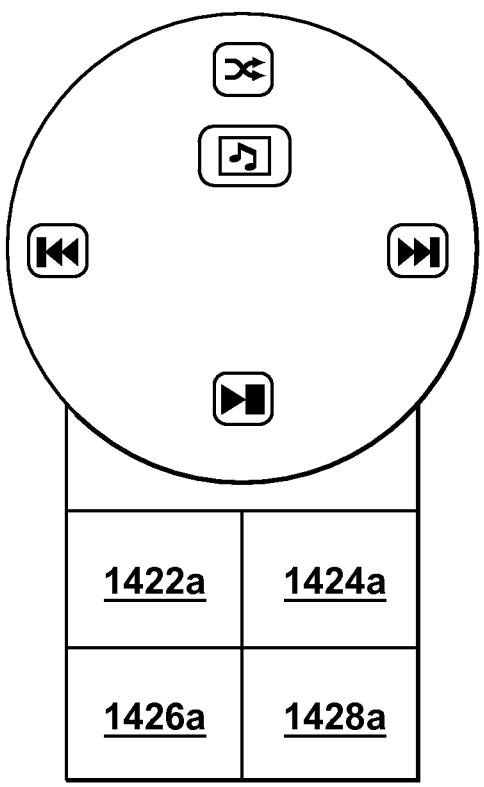
FIG. 3C is a front view of an input assembly, in accordance with another example embodiment of the present disclosure.

Reference is next made to FIGS. 2, 3A and 3B, illustrating an example embodiment of an input assembly 300 of the electronic apparatus 102. FIG. 2 shows the input assembly 300 in an exploded view. FIG. 3A shows the input assembly 300 in a front view. FIG. 3B shows the input assembly 300 in a side cutaway view.

As mentioned above, the input assembly 300 includes the graphic display layer 302, the masking layer 304 and the input device 142. The input device 142 is touch sensitive and in some example embodiments is provided over the masking layer 304. The input device 142 is typically designed to allowing viewing of at least a portion of the masking layer 304 and/or the graphic display layer 302, in some examples the input device 142, or at least a portion of the input device 142, is transparent or translucent. Although the input assembly 300 is shown in a circular shape, other configurations are possible.

Figure 4A:
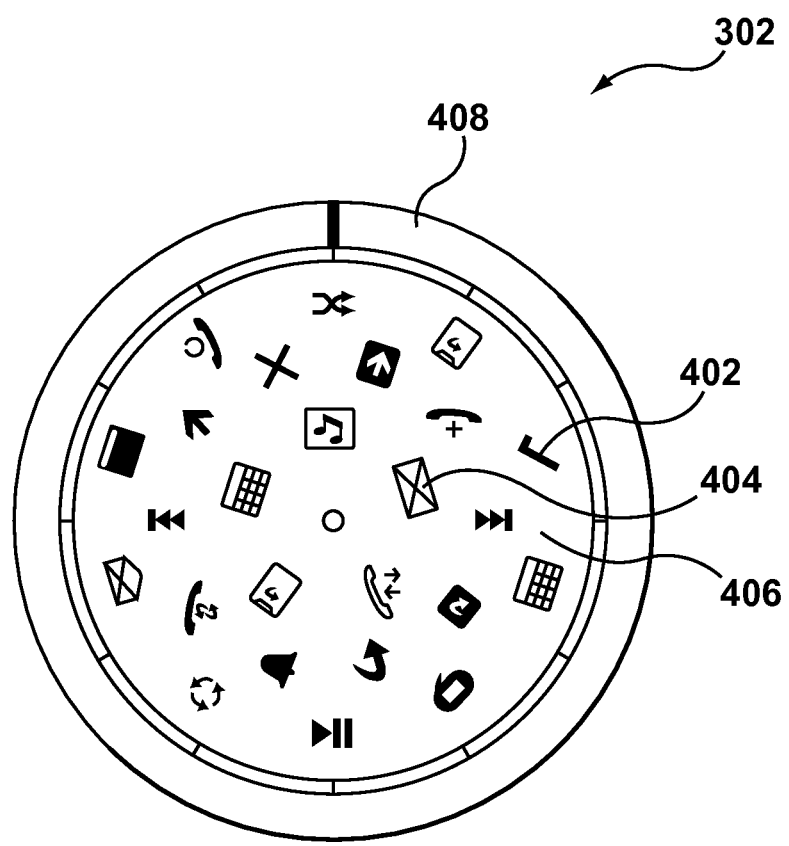
FIG. 4A is a front view of an example icon device suitable for use in the input assembly of FIG. 2.

Reference is now made to FIG. 4A, showing a front view of the graphic display layer 302 according to an example embodiment. In this example, the graphic display layer 302 is disc-shaped, and includes an icon face 406 and a bezel 408. The graphic display layer 302 provides, or is configured to provide, a plurality of function icons 402.

In some example embodiments, the graphic display layer 302 also provides, or is configured to provide, application icons 404, each of which is associated with an application on the electronic apparatus 102. Each application icon 404 is positionally related, on the graphic display layer 302, with associated function icons 402, and each one of the associated function icons 402 correspond with a respective function of the application icon 404 with which they are associated. By "positionally related," it is meant that the application icon 404 is in a position on the graphic display layer 302 relative to the associated function icons 402, such that the application icon 404 and each of the associated function icons 402 are displayable together through the masking layer 304, as will be described below. In this example, the function icons 402 and any application icon 404 are provided on the icon face 406. The bezel 408 effects rotatable coupling of the graphic display layer 302 to both of the masking layer 304 and the input device 142, such that the graphic display layer 302 is rotatable relative to both of the masking layer 304 and the input device 142.

Figure 4B:
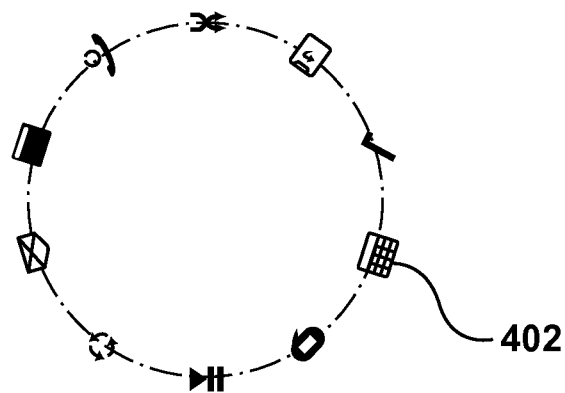
FIG. 4B illustrates example icons suitable for use in the icon device of FIG. 4A.
Figure 4B:
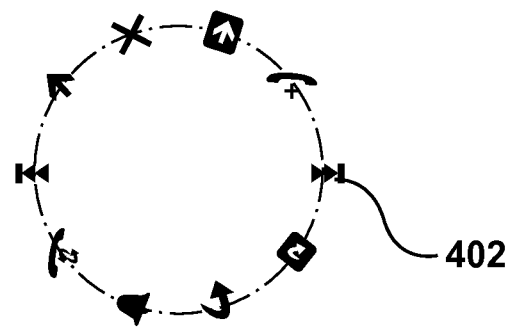
Figure 4B:
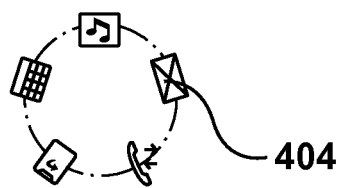

FIG. 4B illustrates examples of function icons 402 and application icons 404 provided by the graphic display layer 302. In this example, the function icons 402 and application icons 404 are arranged to fit a disc-shaped graphic display layer 302, and are arranged in concentric circles, which are shown separated for ease of visualization. The example function icons 402 are each associated with a function of an application, such as a message application, a media application, a calendar application, a task application, and a call log application. The function icons 402 are associated with different functions of different applications, for example, depending on the applications stored in the electronic apparatus 102 and the capabilities of the electronic apparatus 102. The example application icons 404 are each associated with a message application (e.g., an email manager), a media application (e.g., a music player), a calendar application, a task application, and a call log application. The application icons 404 are typically associated with different applications, for example, depending on the applications stored in the electronic apparatus 102 and the capabilities of the electronic apparatus 102. When arranged together on the graphic display layer 302, the application icons 404 are positionally related to the function icons 402, as will be described further below.

Figure 5:
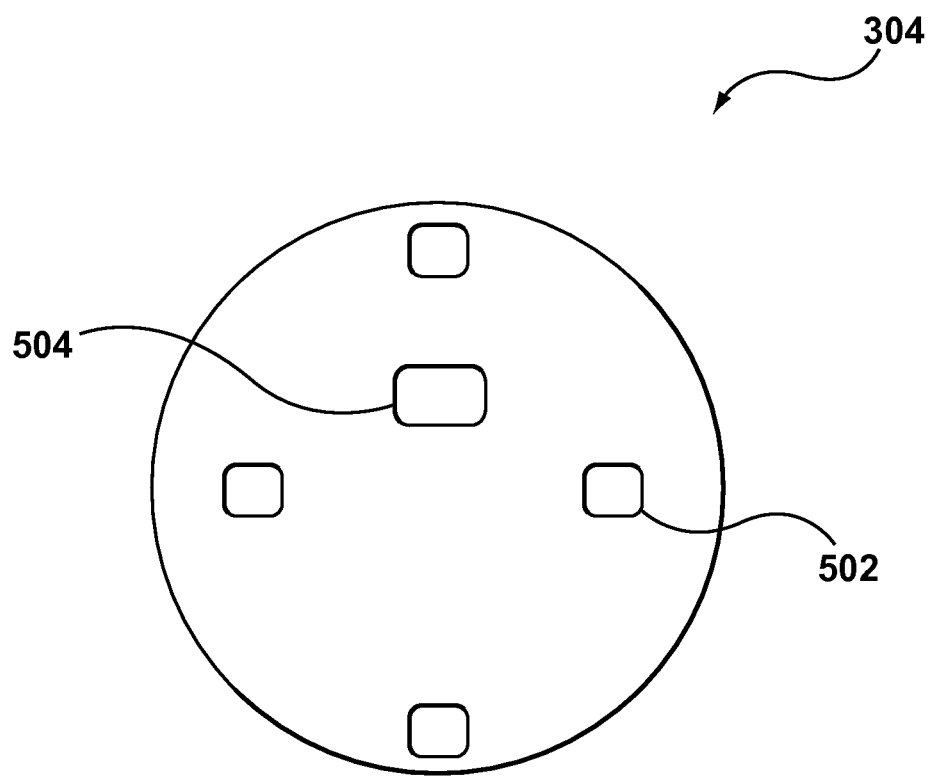
FIG. 5 is a front view of an example masking layer suitable for use in the input assembly of FIG. 2.

FIG. 5 shows a front view of the masking layer 304 in an example embodiment. The masking layer 304 includes function icon windows 502 through which function icons 402 associated with a particular application can be displayed. The masking layer 304 is configured to allow function icons 402 associated with a particular application to be displayed through the function icon windows 502 while obscuring the other function icons 402. The graphic display layer 302 is moveable relative to the masking layer 304, and cooperates with the masking layer 304 such that the function icons 402 are selectively positionable relative to the masking layer 304, so as to display the function icons 402 associated with a particular application through the function icon windows 502 while obscuring the other function icons 402. In this example, the masking layer 304 and the graphic display layer 302 are both circular, and the graphic display layer 302 is rotatable relative to the masking layer 304 about a common centre. Other relative movement, such as sliding (see below), is possible, depending on the configurations of the masking layer 304 and the graphic display layer 302.

In some examples, the masking layer 304 also includes an application icon window 504 through which an application icon 404 can be displayed. In this respect, application icons 404 are provided on the graphic display layer 302, as described above. The graphic display layer 302 cooperates with the masking layer 304 such that the application icons 404 are selectively positionable relative to the masking layer 304, so as to display an application icon 404 through the application icon window 504, and also to display its associated function icons 402 through the function icon windows 502. If the application display window 504 is provided, the application icon window 504 and the function icon windows 502 are arranged according to the positional relationship between the application icons 404 and its respective associated function icons 402, such that when the application icon 404 is displayed through the application icon window 504, the respective associated function icons 402 are also displayed through respective function icon windows 502 while the masking layer 304 obscures the other function icons 402 that are not associated with the displayed application icon 404.

Reference is now made to FIG. 3A. In this example, the masking layer 304 is disc-shaped and provides four function icon windows 502, and an application icon window 504. As the graphic display layer 302 is rotated relative to the masking layer 304, different application icons 404, and their respective positionally related function icons 402, are displayed through the respective application icon window 504 and the function icon windows 502. In this example, each application icon 404 is positionally related to four related function icons 402. When the graphic display layer 302 is positioned to display one of the application icons 404, each one of the four positionally related function icons 402 is displayed through a respective function icon window 502, and the other function icons 402 are obscured by the masking layer 304.

Referring still to FIG. 3A, in this example, the input device 142 (not shown) is disposed over the masking layer 304. In some embodiments, the input device 142 is typically configured to match the configuration of the masking layer 304. In this example, it is disc-shaped and sized to match the disc-shaped masking layer 304. The input device 142 in this example is static relative to the masking layer 304. The input device 142 is designed to allow viewing of a displayed function icon 402 through the respective function icon window 502 and, where applicable, a displayed application icon 404 through the application icon window 504. In this example, the input device 142 is transparent. As described above, the input device 142 receives touch input through capacitive coupling. In particular, the input device 142 receives gesture input. A received gesture input invokes the function associated with a displayed function icon 402. For example, when a gesture input is received at the input device 142, a signal is transmitted to the microprocessor 140 indicating the received input. The microprocessor 140 then processes the signal and causes the function to be invoked. The input device 142 includes a plurality of input device sections 1422, 1424, 1426, 1428, each configured for receiving a gesture input. The input device sections, in some examples, are capacitive sections each having capacitive coupling as described above. Each capacitive section, in some examples, is a single capacitor in the capacitive touch-sensitive overlay 180, as described above, and separate from another capacitor for another respective capacitive section. In other examples, each capacitive section includes two or more capacitors in the capacitive touch-sensitive overlay 180, and a touch input sensed by any one of the capacitors belonging to a capacitive section is processed as being sensed in that capacitive section. In some examples, each input device section cooperates with a respective function icon window 502 so that the receiving of a gesture input by a given input device section invokes the function associated with the function icon being displayed through the function icon window respective to that given input device section.

For example, when a gesture input is received by an input device section, the signal transmitted to the microprocessor 140 indicates the sensed input as well as the input device section at which the input was sensed. The microprocessor 140 then processes the signal, based on which input device section sensed the gesture input, and causes the appropriate function to be invoked. Where there are multiple function icons 402 displayed through respective function icon windows 502, the associated function of each function icon 402 is invokable by a gesture input received by an input device section corresponding to the function icon window 502 through which the function icon 402 is being displayed. For example, each one of the gesture inputs which invokes a function associated with a respective one of the displayed function icons 402 is a gesture input received by an input device section which is generally aligned with or positionally related to the respective one of the function icon windows 502 which displays the respective function icon 402. Where the input device includes physical keys, gesture input which invokes function associated with a respective one of the displayed function icons 402 is a gesture input received by a physical key which is generally aligned with or positionally related to the respective one of the function icon windows displaying the respective function icon 402.

For example, where the masking layer 304 includes four function icon windows 502, there are four gestures for invoking the function associated with the function icons 402 displayed through the function icon windows 502. Each one of the four gesture inputs is a gesture input received by an input device section which is aligned with a respective one of the four function icon windows 502 displaying a respective function icon 402. The input device 142 is correspondingly divided into four capacitive input device sections (in this case, "quadrants" 1422, 1424, 1426, 1428, such as indicated with dotted lines in FIG. 3A), each capacitive quadrant aligned with a function icon window 502 which is displaying a function icon 402. Using this configuration, any touch input received in a given capacitive quadrant 1422, 1424, 1426, 1428 of the input device 142 is associated with the function icon 402 being displayed through the function icon window 502 which is aligned with the capacitive quadrant of the input device 142 receiving the touch input. In some examples, a gesture input is received by the input device 142 as an input that travels between two or more input device sections, such as two or more capacitive quadrants 1422, 1424, 1426, 1428. For example, if the input device 142 receives a touch input at a first capacitive quadrant and a subsequent touch input at a second adjacent capacitive quadrant within a time period of about 0.1 s, this is considered a single gesture input directed from the first capacitive quadrant to the second capacitive quadrant.

When a gesture input is received by the input device 142, a signal is transmitted to invoke the function associated with the function icon 402 that is being displayed through the function icon window 502. In some examples, this involves the input device 142 receiving the gesture input, transmitting a signal representing the gesture input to the microprocessor 140, and the microprocessor 140 invoking the appropriate associated function according to the gesture input and the position of the masking layer 304 relative to the graphic display layer 302. In this respect, the input assembly 300 informs the user as to the gesture input needed to invoke a desired function, based on the position of the function icon window 502 through which the function icon 402 is being displayed.

FIGS. 6A-6E illustrate an example operation of the input assembly 300 according to an example embodiment.

FIG. 6A shows the input assembly 300 configured to accept gesture inputs for invoking function associated with a message application (e.g., an email manager). The application icon 404 associated with the message application is displayed through the application icon window 504 and the positionally related function icons 402 associated with functions of the message application (e.g., open message, delete message, reply, etc.) are displayed through respective function icon windows 502. The input assembly 300 thus informs the user of the gesture input for invoking each function associated with each respective function icon 402 being displayed. For example, a gesture input across the input device 142 from left to right or, alternatively, a touch input in the right-hand capacitive quadrant 1422, invokes a "reply" function associated with the function icon 402 displayed through the respective right-hand positioned function icon window 502. A gesture input across the input device 142 from right to left or, alternatively, a touch input in the left-hand capacitive quadrant 1424, invokes a "delete" function associated with the function icon 402 displayed through the respective left-hand positioned function icon window 502. A gesture input from the bottom to top or, alternatively, a touch input in the upper capacitive quadrant 1426, invokes the "in-box" function associated with the function icon 402 displayed through the respective upper positioned function icon window 502. A gesture input from the top to bottom or, alternatively, a touch input in the lower capacitive quadrant 1428, invokes the "sent mail" function associated with the function icon 402 displayed through the respective lower positioned function icon window 502.

In some examples, a gesture input has a beginning point in a first capacitive section and an ending point in a second different capacitive section, either directly opposite the first capacitive section or not, in order to invoke a function associated with the function icon 402 displayed in the second capacitive section. In other examples, a gesture input is confined to one capacitive section, and a direction of the gesture input is sensed within that one capacitive section in order to invoke the desired function. For example, although operation of the input assembly 300 has been described, with respect to FIG. 6A, using the input device 142 having four capacitive quadrants 1422, 1424, 1426, 1428, the input device 142 can have more or less capacitive sections. In some examples, more than one capacitive section is aligned with and associated with a single function icon window 502, such that an input sensed in any one of the capacitive sections aligned with that single function icon window 502 will invoke the function of the function icon 402 displayed in that function icon window 502.

FIG. 6B shows the input assembly 300 configured to accept gesture inputs for invoking a function associated with a media application (e.g., a music player). The input assembly 300 is brought into this configuration by selectively positioning the graphic display layer 302 relative to the masking layer 304 (e.g., by rotating the graphic display layer 302 while the masking layer 304 is fixed about a common axis of rotation 602, or vice versa) so that the application icon 404 associated with the media application is displayed through the application icon window 504 and the positionally related function icons 402 associated with functions of the media application (e.g., play, skip forward, skip backward, etc.) are displayed through respective function icon windows 502. In this example, as indicated by the arrow, a clockwise rotation of the graphic display layer 302 brings the input assembly 300 from the configuration of FIG. 6A to the configuration of FIG. 6B. For example, the graphic display layer 302 and the masking layer 304 share a common center and the common axis of rotation 602 (shown only in FIG. 6B, for simplicity), and this rotation is facilitated by a user gripping the bezel 408 of the graphic display layer 302 to rotate the graphic display layer 302 about the common axis 602 while the masking layer 304 is fixed relative to the common axis 602. As described above with respect to FIG. 6A, the input assembly 300, in the configuration of FIG. 6B, thus informs the user of the gesture input for invoking each function associated with each respective function icon 402 displayed, in this case pertaining to the media application. For example, a gesture input across the input device 142 from left to right or, alternatively, a touch input in the right-hand capacitive quadrant 1422, invokes a "skip forward" function associated with the function icon 402 displayed through the respective right-hand positioned function icon window 502. A gesture input across the input device 142 from right to left or, alternatively, a touch input in the left-hand capacitive quadrant 1424, invokes a "skip backward" function associated with the function icon 402 displayed through the respective left-hand positioned function icon window 502.

FIG. 6C shows the input assembly 300 configured to accept gesture inputs for invoking a function associated with a calendar application (e.g., a virtual calendar). The input assembly 300 is brought into this configuration similar to the manner described above with respect to FIG. 6B. In this example, as indicated by the arrow, a clockwise rotation of the graphic display layer 302 about the common axis 602 brings the input assembly 300 from the configuration of FIG. 6B to the configuration of FIG. 6C. As described above with regards to FIG. 6A, the input assembly 300, in the configuration of FIG. 6C, thus informs the user of the gesture input for invoking each function associated with each respective function icon 402 displayed, in this case pertaining to the calendar application. For example, a gesture input across the input device 142 from left to right or, alternatively, a touch input in the right-hand capacitive quadrant 1422, invokes a "next week" function associated with the function icon 402 displayed through the respective right-hand positioned function icon window 502. A gesture input across the input device 142 from right to left or, alternatively, a touch input in the left-hand capacitive quadrant 1424, invokes a "set alarm" function associated with the function icon 402 displayed through the respective left-hand positioned function icon window 502.

FIG. 6D shows the input assembly 300 configured to accept gesture inputs for invoking a function associated with a task application (e.g., a task manager). The input assembly 300 is brought into this configuration similar to the manner described above with respect to FIG. 6B. In this example, as indicated by the arrow, a clockwise rotation of the graphic display layer 302 about the common axis 602 brings the input assembly 300 from the configuration of FIG. 6C to the configuration of FIG. 6D. As described above with regards to FIG. 6A, the input assembly 300, in the configuration of FIG. 6D, thus informs the user of the gesture input for invoking each function associated with each respective function icon 402 displayed, in this case pertaining to the task application. For example, a gesture input across the input device 142 from left to right or, alternatively, a touch input in the right-hand capacitive quadrant 1422, invokes a "next task" function associated with the function icon 402 displayed through the respective right-hand positioned function icon window 502. A gesture input across the input device 142 from right to left or, alternatively, a touch input in the left-hand capacitive quadrant 1424 invokes a "task complete" function associated with the function icon 402 displayed through the respective left-hand positioned function icon window 502.

FIG. 6E shows the input assembly 300 configured to accept gesture inputs for invoking a function associated with a call log application (e.g., a voicemail manager). The input assembly 300 is brought into this configuration similar to the manner described above with respect to FIG. 6B. In this example, as indicated by the arrow, a clockwise rotation of the graphic display layer 302 about the common axis 602 brings the input assembly 300 from the configuration of FIG. 6D to the configuration of FIG. 6E. As described above with regards to FIG. 6A, the input assembly 300, in the configuration of FIG. 6E, thus informs the user of the gesture input for invoking each function associated with each respective function icon 402 displayed, in this case pertaining to the call log application. For example, a gesture input across the input device 142 from left to right or, alternatively, a touch input in the right-hand capacitive quadrant 1422, invokes a "return call" function associated with the function icon 402 displayed through the respective right-hand positioned function icon window 502. A gesture input across the input device 142 from right to left or, alternatively, a touch input in the left-hand capacitive quadrant 1424, invokes a "delete record" function associated with the function icon 402 displayed through the respective left-hand positioned function icon window 502.

It is understood that, for at least some of the above-described applications and associated functions, a display is necessarily provided in order to carry out the gestural interaction. For example, when the user is invoking the "delete" function with a gesture input while in the "inbox" application, a display is provided to inform the user which items are available for deletion.

In this respect, for example, as explained above, the input device 142 could include a display aspect. Alternatively, or in addition, the electronic apparatus 102 includes a display, such as an electronic display (not shown). As a further alternative, or in addition, in some examples the electronic apparatus 102 cooperates with a separate display apparatus, for example a separate electronic display screen, such as through wired or wireless communication. The display apparatus responds to input received through the electronic apparatus 102.

Thus, FIGS. 6A-6E illustrate examples of the input assembly 300 in different configurations, each having the graphic display layer 302 in a different position relative to the masking layer 304. The invocation of the function in response to sensing the gesture input is based on the positioning of the graphic display layer 302 relative to the masking layer 304. That is, when the graphic display layer 302 is in a first position relative to the masking layer 304 (e.g., as in FIG. 6A), a first set of functions is invokable (e.g., functions associated with the message application); while when the graphic display layer 302 is in a second position relative to the masking layer 304 (e.g., as in FIG. 6B), a second set of functions is invokable (e.g., functions associated with the media application).

Although the graphic display layer 302 and the masking layer 304 have been described as being positionable relative to each other via a rotational movement, in other example embodiments, other movements are suitable, including sliding or flipping movements, and typically are dependent on the shape and/or arrangement of the input assembly 300. Although the rotational movement is shown only in the clockwise direction, rotational movement in a counter-clockwise direction is also possible. In other examples, the masking layer 304 has more or less (but at least one) function icon windows 502 than shown in the examples, and more or less or none application icon windows 504 than shown in the examples. Although operation of the input assembly 300 has been described with respect to four input device sections, specifically four capacitive quadrants 1422, 1424, 1426, 1428, in the input device 142, in some examples the input device 142 has more or less capacitive sections, and these are sectioned in any suitable manner, for example to align with the function icon windows 502 on the masking layer 304. In some examples, the graphic display layer 302 is rotatable about the common axis 602 while the masking layer 304 is fixed relative to the common axis 602. In other examples, the masking layer 304 is rotatable about the common axis 602 while the graphic display layer 302 is fixed relative to the common axis 602. In yet other examples, both the masking layer 304 and the graphic display layer 302 are rotatable about the common axis 602, independent of each other. In some examples, the graphic display layer 302 also includes markings or indications, for example on the bezel 408, for indicating how to position the graphic display layer 302 relative to the masking layer 304 in order to display a desired function through the function object display window 502.

Figure 7:
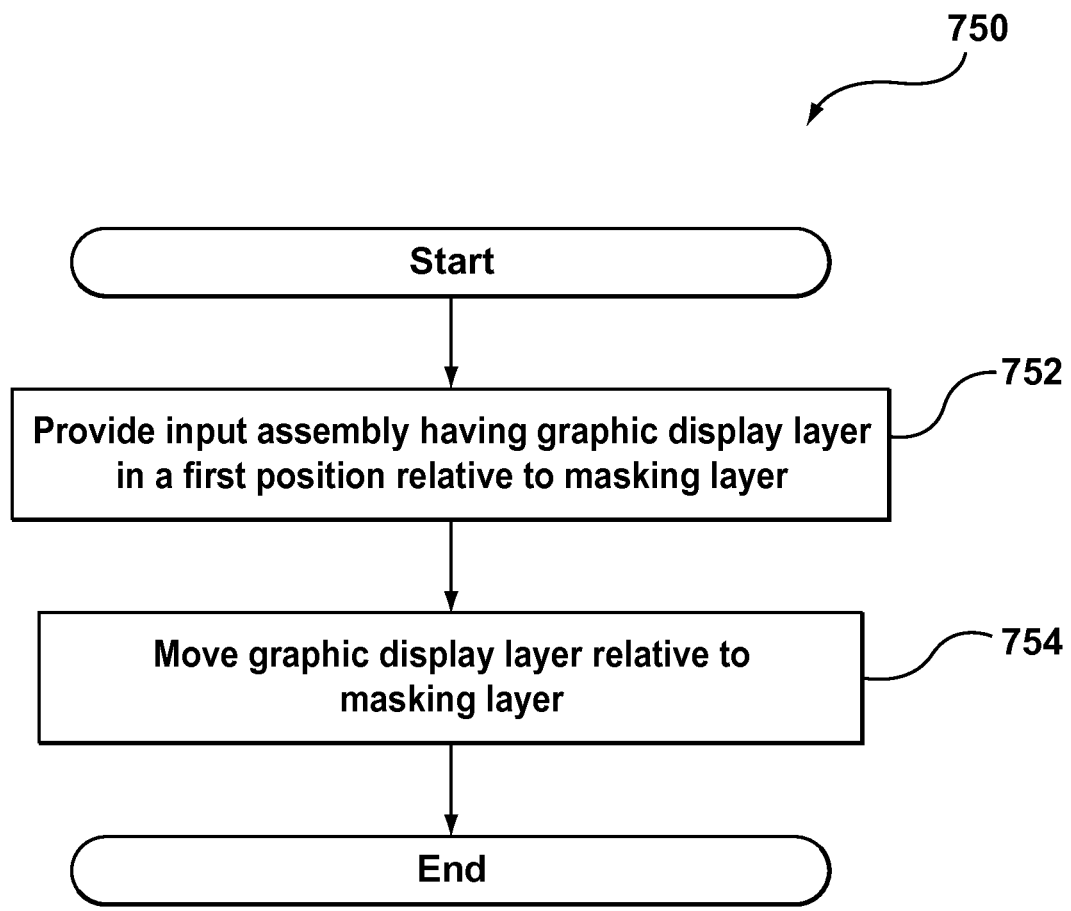
FIG. 7 is a flowchart illustrating an example method in accordance with an example embodiment.

Reference is now made to FIG. 7, which is a flowchart illustrating an example method 750 of configuring an electronic apparatus to invoke a desired function based on a gesture input.

At 752, the input assembly 300 is provided, for example having the graphic display layer 302 in a first position relative to the masking layer 304. For example, in the first position, one or more function icons 402 are displayed through respective one or more function icon windows 502 on the masking layer 304 (for example, see FIG. 6A).

At 754, the graphic display layer 302 is moved relative to the masking layer 304. The movement causes the graphic display layer 302 to be positioned relative to the masking layer 304 such that a selected application icon 404 associated with a desired application having the desired function is displayed through the application icon window 504 and each one of the respective one or more related function icons 402 is respectively displayed through one of the one or more function icon windows 502. The desired function is associated with a selected function icon 402 displayed. In some examples, movement of the graphic display layer 302 relative to the masking layer 304 is sensed through a position or movement sensor, and processed by the microprocessor 140.

In some examples, the method 750 further includes receiving a gesture input by the input device 142. For example, this is done via the capacitive coupling described above. Typically, a signal representing the sensed gesture input is transmitted to the microprocessor 140.

In some examples, the method 750 also includes invoking the desired function based on: (i) the received gesture input, and (ii) the position of the graphic display layer 302 relative to the masking layer 304. Typically, the microprocessor 140 causes the desired function to be invoked, based on the transmitted signal representing the sensed gesture input and based on the position of the graphic display layer 302 relative to the masking layer 304. For example, the graphic display layer 302 is positioned relative to the masking layer 304 such that the selected application icon 404 is displayed through the application icon window 504 and each one of the respective one or more related function icons 402 is displayed through one of the function icon windows 502. The desired function is associated with a selected function icon 402 being displayed.

In some examples, there are gesture inputs, such as where there is a plurality of input device sections each aligned with a respective function icon window 502, and a gesture input received at each input device section is one which is aligned with the function icon 402 being displayed through the respective function icon window 502. In other examples, gesture inputs are different directional gesture inputs, typically aligned with the direction of a respective function icon window 502 (e.g., a gesture input directed towards a given function icon window 502 is a gesture input invoking the function associated with the function icon 402 displayed through that given function icon window 502). Where there are gesture inputs, this information is also received at the input device 142 (e.g., based on which input device section sensed the gesture input) and the signal transmitted to the microprocessor 140 representing the received gesture input also includes this information. The microprocessor 140 then causes the desired function to be invoked based on the gesture input and the position of the masking layer 304 relative to the graphic display layer 302.

The invoked function is typically associated with an application, and invoking the function typically involves invoking the associated application. As described above, in some examples, the function invoked is at least partly determined by the position of the graphic display layer 302 relative to the masking layer 304. In some examples, the position of the graphic display layer 302 relative to the masking layer 304 is detected or sensed (e.g., by a position sensor) and this information is provided to the microprocessor 140 to thus invoke the appropriate function based on the position of the graphic display layer 302 relative to the masking layer 304. In some examples, the input assembly 300 includes a position sensor (not shown) for sensing the position of the graphic display layer 302 relative to the masking layer 304. The position sensor, in some examples, is a magnetic position sensor. One or more components of the magnetic positions sensor are positioned on the masking layer 304 in order to trigger sensing by one or more complementary components of the magnetic position sensor positioned on the graphic display layer 302, through the Hall effect. In other examples, the position sensor is a variable resistance mechanism, such as a potentiometer, positioned between the masking layer 304 and the graphic display layer 302, in which the resistance of the position sensor varies detectably according to the position of the graphic display layer 302 relative to the masking layer 304. In other examples, the position sensor is an optical encoder that optically senses the position of the graphic display layer 302 relative to the masking layer 304.

Figure 8A:
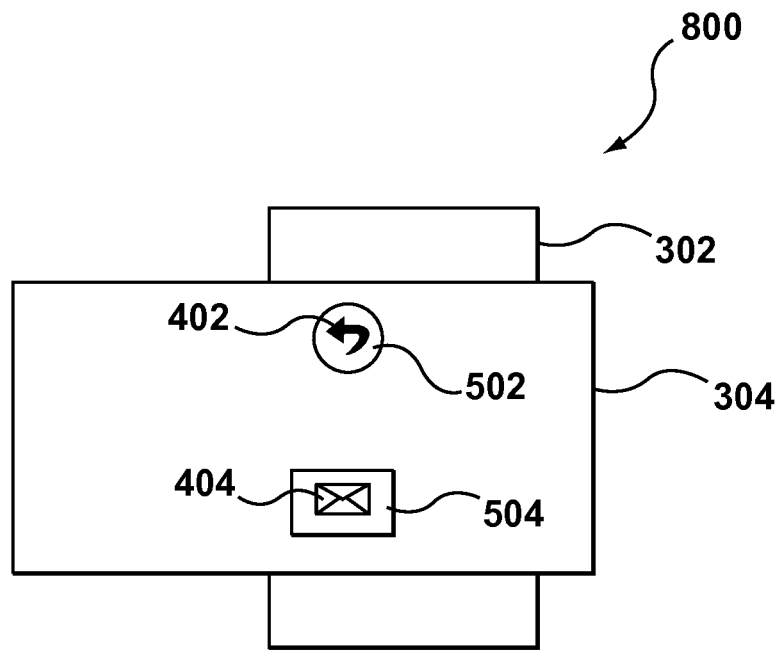
FIGS. 8A and 8B are front views of an input assembly in accordance with another embodiment.
Figure 8B:
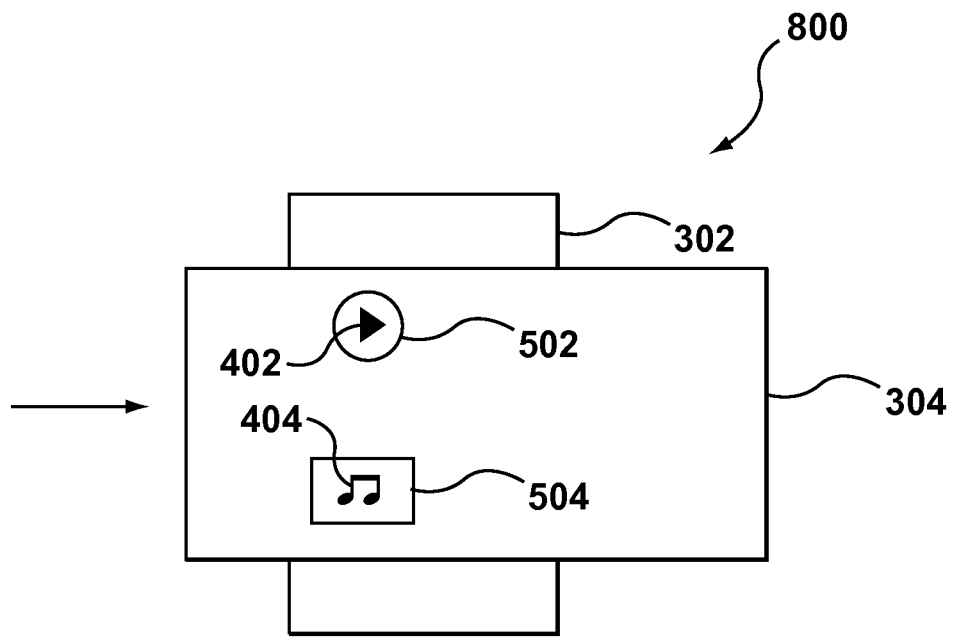

Although the input assembly 300 has been described with respect to certain example embodiments, these are for the purpose of illustration only and are not intended to be limiting. For example, FIGS. 8A and 8B illustrate an example input assembly 800 in which the masking layer 302 cooperates with the graphic display layer 304 in a relative sliding movement (e.g., side-to-side sliding). FIG. 8A shows the input assembly 800 in a first position effecting the display of a first set of function icon 402 and application icon 404, and FIG. 8B shows the input assembly 800 in a second position effecting the display of a second set of function icon 402 and application icon 404, the second position obtained by moving the masking layer 302 in a sideways sliding movement (indicated by an arrow) relative to the graphic display layer 304.

Figure 9A:
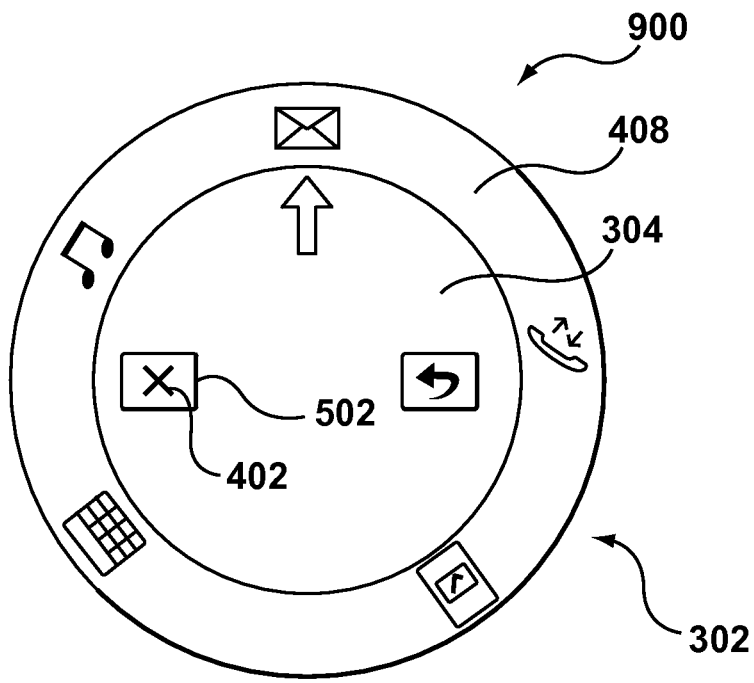
FIGS. 9A and 9B are front views of an input assembly in accordance with another embodiment.
Figure 9B:
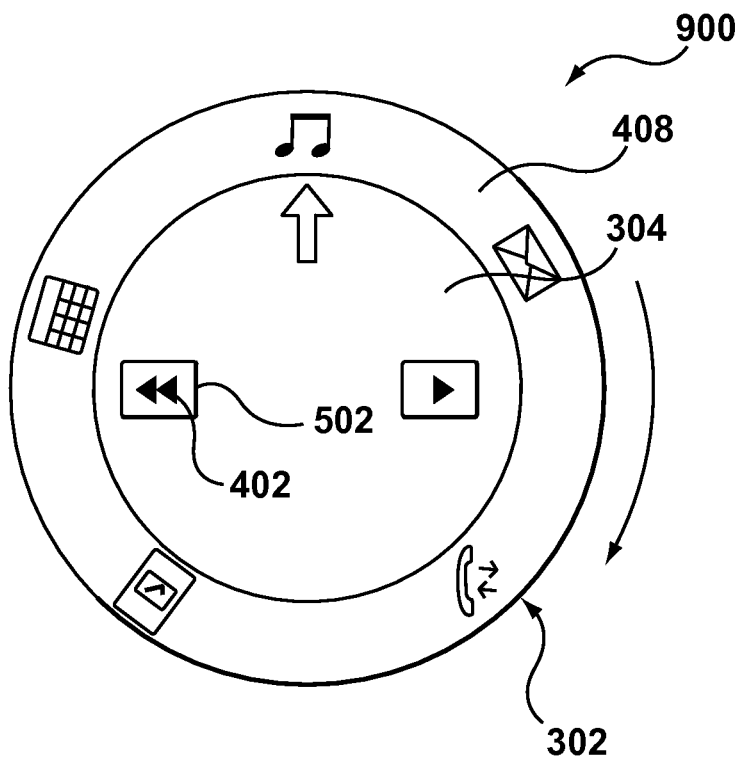

In another example, FIGS. 9A and 9B illustrate an example input assembly 900 in which there is no application icon window 504, but rather the application associated with the one or more function icons 402 displayed through the one or more function icon windows 502 is indicated via an indication provided on the graphic display layer 302, for example on the bezel 408, and the desired application is selected, for example by positioning the graphic display layer 302 relative to the masking layer 304 to align an arrow with the indicia representing the desired application. Other such variations are possible. FIG. 9A shows the input assembly 900 in a first position effecting the display of a first set of function icons 402, and FIG. 9B shows the input assembly 900 in a second position effecting the display of a second set of function icons 402, the second position obtained by moving the graphic display layer 302 in a rotating movement (indicated by an arrow) relative to the masking layer 304. In this respect, the indicia provided on the bezel, as well as the combination of the application icons 404 and the application icon window 504, are examples of an application identifier configured to identify the particular application with which the displayed function icons are associated.

Figure 10:
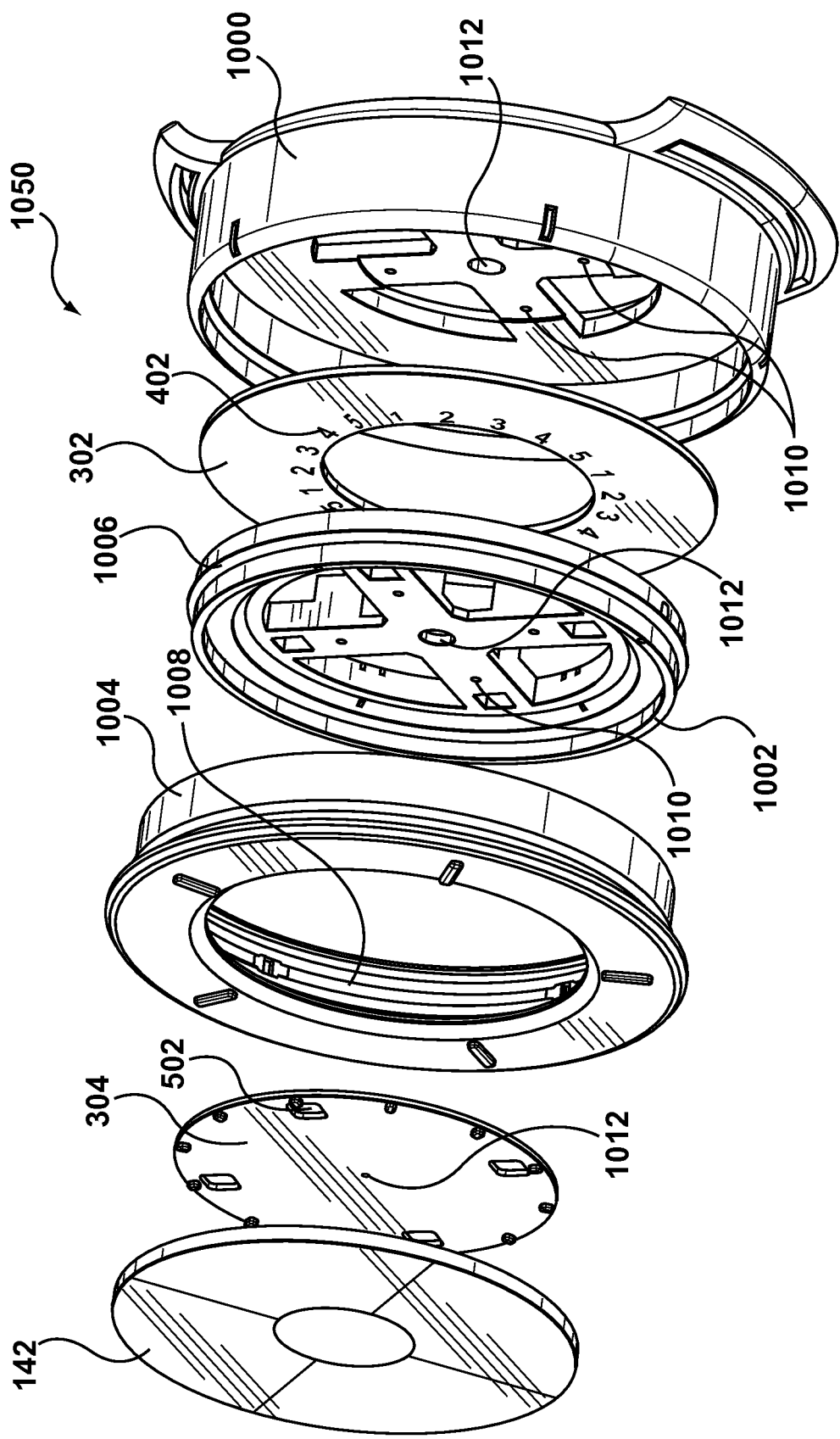
FIG. 10 is an isometric exploded view of an input assembly in accordance with another embodiment.

Reference is now made to FIG. 10, which shows an isometric exploded view of an example input assembly 1050, which in this case is suitable for an electronic apparatus such as a watch. In this example, the input assembly 1050 also includes a base 1000, a support 1002 and a bezel 1004, which, in this example, are each formed of plastic, although other materials with similar properties may also be suitable. The input assembly 1050 further includes the graphic display layer 302 and the masking layer 304, which, in this example, are also formed of plastic, although other suitable materials can be used. The bezel 1004 and the graphic display layer 302 are coupled together such that they are fixed relative to each other. For example, the graphic display layer 302 is press-fitted into a groove within the bezel 1004.

The support 1002 supports the masking layer 304 and the input device 142 and is sandwiched between the graphic display layer 302 and the bezel 1004. In this example, the support 1002 includes a ridge 1006 that cooperates with a complementary groove 1008 defined in the bezel 1004, to limit the movement of the bezel 1004 relative to the support 1002. The support 1002 is freely rotatable relative to the graphic display layer 302 and the bezel 1004, about a common center. The support 1002 is coupled to the base 1000 such that they are fixed relative to each other. For example, the support 1002 and the base 1000 define corresponding apertures 1010 for coupling the support 1002 and the base 1000 using screws.

The masking layer 304 and the input device 142 are coupled to the support 1002 such that they are fixed relative to each other. For example, each one of the masking layer 304 and the input device 142 is press-fitted and/or glued into the support 1002. In this example, the masking layer 304, the support 1002 and the base 1000 each define a corresponding center aperture 1012 allowing the attachment of watch hands, such as where the electronic apparatus 102 is a watch. Thus, the base 1000, the support 1002, the masking layer 304 and the input device 142 are all fixed relative to each other. The graphic display layer 302 and the bezel 1004 are also fixed relative to each other. The graphic display layer 302 and the bezel 1004 are moveable relative to the input device 142, the masking layer 304, the support 1002 and the base 1000. In this case, the graphic display layer 302 and the bezel 1004 share a common center and a common axis with the input device 142, the masking layer 304, the support 1002 and the base 1000. In other words, the graphic display layer 302 and the bezel 1004 are rotatable about the common axis while the input device 142, the masking layer 304, the support 1002 and the base 1000 are fixed relative to the common axis. Alternatively, the bezel 1004 and the masking layer 304 are fixed relative to one another, and the input device 142, the graphic display layer 302, the support 1002 and the base 1080 are fixed relative to one another, wherein the masking layer 304 rotates with the bezel 1004 about the common axis, whereas the input device 142, the graphic display layer 302, the support 1002 and one base 1000 are fixed relative to the common axis. Other configurations are possible, such as the configurations described above.

For example, the bezel 1004 and the graphic display layer 302 can be coupled together via a gear mechanism (not shown), such that the bezel 1004 and the graphic display layer 302 are rotatable about a common center. In this example, rotational movement of the bezel 1004 results in corresponding rotational movement of the graphic display layer 302 to a lesser or greater degree, depending on the gear ratio of the gear mechanism. This is useful where precise movement of the graphic display layer 302 is desired (e.g., where icons 402, 404 are closely spaced on the graphic display layer 302), since gross movement of the bezel 1004 translates into minute movement of the graphic display layer 302, using the appropriate gear ratio.

Reference is now made to FIG. 11, which shows a block diagram illustrating an electronic apparatus 102 in accordance with an embodiment of the present disclosure. It will be understood that references to an electronic apparatus in this disclosure also includes a touchscreen device, a wireless device, or a wireless communication device.

The electronic apparatus 102 typically includes a battery interface 136 for receiving one or more rechargeable batteries 138. The battery 138 provides electrical power to at least some of the electrical circuitry in the electronic apparatus 102, and the battery interface 136 provides a mechanical and electrical connection for the battery 138. The battery interface 136 is typically coupled to a regulator (not shown) which provides power V+ to the circuitry of the electronic apparatus 102.

The electronic apparatus 102 includes a microprocessor 140 which controls the overall operation of the electronic apparatus 102. The microprocessor 140 typically interacts with device subsystems such as the input device 142, a flash memory 144, a random access memory (RAM) 146, a read-only memory (ROM) 148, and any other device subsystems generally designated as 164. Examples of other device subsystems include a display, auxiliary input/output (I/O) subsystems, a data port such as serial port, a keyboard or keypad, a speaker or audio port for connecting to, for example a set of headphones or an earpiece, and a microphone.

Operating system software used by the microprocessor 140 is typically stored in a persistent store, for example the flash memory 144, the ROM 148 or other similar storage element. Those skilled in the art will appreciate that the operating system, specific device applications, or parts thereof, can be temporarily loaded into a volatile store such as the RAM 146.

The microprocessor 140, in addition to its operating system functions, enables execution of software applications on the electronic apparatus 102. A predetermined set of applications that control basic device operations, including media applications, are typically installed on the electronic apparatus 102 during or after manufacture. The electronic apparatus 102 typically includes a personal information manager (PIM) application having the ability to organize and manage data items relating to a user such as, but not limited to, instant messaging, email, calendar events, voice mails, appointments, and task items. One or more memory stores are typically available on the electronic apparatus 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards or mini SD cards, etc.

In some examples, in a voice communication mode, a received data signal representing a voice transmission is output to a speaker or audio port and signals for transmission are generated by a transducer such as a microphone. In some examples, alternative voice or audio I/O subsystems, such as a voice message recording subsystem, are also implemented on the electronic apparatus 102. Although a voice or audio signal output is typically accomplished primarily through a speaker or audio port, in some examples, other output are also provided through a display, for example an indication of the identity of a calling party, duration of a voice call, or other voice call related information. In some examples, stereo headphones or an earpiece are used in place of the speaker.

The electronic apparatus 102 includes a memory, which typically has various software components for controlling the electronic apparatus 102 and typically includes, for example, the flash memory 144, the RAM 146, the ROM 148, the memory module 130 and/or the other device subsystems 164. To provide a user-friendly environment to control the operation of the electronic apparatus 102, an operating system (OS) resident on the electronic apparatus 102 typically provides a basic set of operations for supporting various applications typically operable through a user interface, such as that presented by the input device 142.

In some example embodiments, the memory also includes an email and calendar client, which are combined in, for example, a PIM application having email-based calendaring and scheduling functions. Typically, the PIM is installed as one of the software modules. Thus, the electronic apparatus 102 includes computer executable programmed instructions for directing the electronic apparatus 102 to implement various applications. For example, the programmed instructions are tangibly embodied in the one or more software modules resident in the memory of the electronic apparatus 102. Alternatively, in another example, the programmed instructions are tangibly embodied on a computer readable medium (such as a DVD, CD, floppy disk or other storage media) having computer executable instructions tangibly recorded thereon, which are used for transporting the programmed instructions to the memory of the electronic apparatus 102.

While the present disclosure includes description of a method, a person of ordinary skill in the art will understand that the present disclosure is also directed to an apparatus for carrying out the disclosed method and including apparatus parts for performing each described method step, be it by way of hardware components, a computer programmed by appropriate software to enable the practice of the disclosed method, by any combination of the two, or in any other manner. Moreover, in some embodiments, an article of manufacture for use with the apparatus, such as a pre-recorded storage device or other similar computer readable medium having program instructions tangibly recorded thereon, or a computer data signal carrying computer readable program instructions directs an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. An input assembly comprising:
 a graphic display layer providing or configured to provide a plurality of function icons each of the function icons corresponding to a function of an application;
 a masking layer defining a plurality of function icon windows for displaying functions icons associated with a particular application; and
 a touch-sensitive overlay including a plurality of sections each configured for receiving gestures;
 the graphic display layer being moveable relative to the masking layer such that, based on a relative positioning between the graphic display layer and the masking layer, the function icons associated with a particular application are displayed through the function icon windows and the other function icons are at least obscured by the masking layer;
 wherein the receiving of the gestures by one of the plurality of sections of the touch-sensitive overlay which corresponds to one of the displayed function icons invokes the function corresponding to the one of the displayed function icons;
 a bezel frame located below the graphic display layer, the graphic display layer being fixed to the bezel frame, wherein the graphic display layer is moveable relative to the masking layer by moving the bezel frame, wherein the bezel frame includes application indicia each representing an application having function icons on the graphic display layer associated and the masking layer includes an arrow, wherein moving the graphic display layer relative to the masking layer so that the arrow is aligned with a particular application indicia moves the graphic display layer into a position associated with the particular application so that the function icons of the particular application are the displayed function icons.

2. The input assembly of claim 1, wherein, when the graphic display layer is disposed at a first position relative to the masking layer, the display of function icons associated with a first application is effected and visibility of each of the other function icons is at least obscured by the masking layer; and
 wherein, when the graphic display layer is disposed at a second position relative to the masking layer, the display of function icons associated with a second application is effected and visibility of each of the other function icons is at least obscured by the masking layer.

3. The input assembly as claimed in claim 1, wherein:
 a plurality of application icons are provided on the graphic display layer, each one of the application icons corresponding to an application associated with respective ones of the function icons;
 an application display window is provided on the masking layer for displaying one of the plurality of application icons provided by the graphic display layer; and
 wherein the identification of the particular application with which the displayed function icons are associated is effected by displaying the corresponding application icon.

4. The input assembly of claim 3, wherein the masking layer at least obscures the other application icons which do not correspond to the particular application with which the displayed function icons are associated.

5. The input assembly of claim 1, wherein the masking layer is provided over the graphic display layer, and the touch-sensitive overlay is provided over the masking layer, wherein at least a portion of the touch-sensitive overlay is transparent or translucent so that the displayed function icons are visible through the touch-sensitive overlay.

6. The input assembly of claim 1, wherein the touch-sensitive overlay is a capacitive touch-sensitive overlay.

7. The input assembly of claim 6, wherein the touch-sensitive overlay is divided into four quadrants, each capacitive quadrant aligned with a function icon window which is displaying a function icon.

8. The input assembly of claim 6, wherein any gesture received in a particular quadrant is associated with the function icon displayed through the function icon window aligned with the quadrant which received the gesture.

9. The input assembly of claim 1, wherein the masking layer, graphic display layer, and the touch-sensitive overlay are each disc-shaped with the function icons of the graphic display layer are arranged in a circle.

10. The input assembly of claim 1, wherein the graphic display layer is slideable relative to the masking layer.

11. The input assembly of claim 1, wherein the graphic display layer is rotatable relative to the masking layer by rotating the bezel frame.

12. The input assembly of claim 1, wherein the gestures are tap gestures or directional gestures.

13. The input assembly of claim 1, further comprising
a position sensor for sensing a position of the graphic display layer relative to the masking layer.

14. An electronic device comprising:
a microprocessor; and
an input assembly comprising:
   a graphic display layer providing or configured to provide a plurality of function icons each of the function icons corresponding to a function of an application;
   a masking layer defining a plurality of function icon windows for displaying functions icons associated with a particular application; and
   a touch-sensitive overlay including a plurality of sections each configured for receiving gestures;
   the graphic display layer being moveable relative to the masking layer such that, based on a relative positioning between the graphic display layer and the masking layer, the function icons associated with a particular application are displayed through the function icon windows and the other function icons are at least obscured by the masking layer;
   a bezel frame located below the graphic display layer, the graphic display layer being fixed to the bezel frame, wherein the graphic display layer is moveable relative to the masking layer by moving the bezel frame, wherein the bezel frame includes application indicia each representing an application having function icons on the graphic display layer associated and the masking layer includes an arrow, wherein moving the graphic display layer relative to the masking layer so that the arrow is aligned with a particular application indicia moves the graphic display layer into a position associated with the particular application so that the function icons of the particular application are the displayed function icons;
   the microprocessor being configured to:
      receive signals from the touch-sensitive overlay of the input assembly representing gestures; and
      cause functions corresponding to one of the displayed function icons to be invoked, the invoked function depending on the signal received from the touch-sensitive overlay and a position of the graphic display layer relative to the masking layer.

15. The electronic device of claim 9,
wherein, when the graphic display layer is disposed at a first position relative to the masking layer, the display of function icons associated with a first application is effected and visibility of the other function icons are at least obscured by the masking layer;
and wherein, when the graphic display layer is disposed at a second position relative to the masking layer, the display of function icons associated with a second application is effected and visibility of the other function icons are at least obscured by the masking layer.

16. The electronic device of claim 14 wherein the input assembly further comprises a bezel frame located below the graphic display layer, the graphic display layer being fixed to the bezel frame, wherein the graphic display layer is moveable relative to the masking layer by moving the bezel frame.

17. A method of invoking a function of an electronic apparatus, the electronic apparatus including a graphic display layer providing or configured to provide, a plurality of function icons, each of the function icons corresponding to a function of an application, a masking layer defining a plurality of function icon windows for displaying function icons associated with a particular application, and a touch-sensitive overlay including a plurality of sections each configured for receiving gestures, and a bezel frame located below the graphic display layer, the graphic display layer being fixed to the bezel frame, wherein the graphic display layer is moveable relative to the masking layer by moving the bezel frame, wherein the bezel frame includes application indicia each representing an application having function icons on the graphic display layer associated and the masking layer includes an arrow, wherein moving the graphic display layer relative to the masking layer so that the arrow is aligned with a particular application indicia moves the graphic display layer into a position associated with the particular application so that the function icons of the particular application are the displayed function icons, the method comprising:
   moving the graphic display layer from a first position relative to the masking layer in which a first set of function icons is displayed to a second position relative to the masking layer in which a second set of function icons is displayed wherein a first set of functions associated with the first set of function icons is invokable in the first position and a second set of functions associated with the second set of function icons is invokable in the second position; and
   invoking a function corresponding to one of the displayed function icons in dependence on a gesture received by the touch-sensitive overlay and a position of the graphic display layer relative to the masking layer.

* * * * *

UNITED STATES PATENT AND TRADEMARK OFFICE
CERTIFICATE OF CORRECTION

| | | |
|---|---|---|
| PATENT NO. | : 8,627,220 B2 | Page 1 of 1 |
| APPLICATION NO. | : 12/571612 | |
| DATED | : January 7, 2014 | |
| INVENTOR(S) | : Steven Henry Fyke et al. | |

It is certified that error appears in the above-identified patent and that said Letters Patent is hereby corrected as shown below:

In the Claims:

In column 18, line 3, the claim should read "15. The electronic device of claim 14..."

Signed and Sealed this
Twenty-second Day of July, 2014

Michelle K. Lee
*Deputy Director of the United States Patent and Trademark Office*